United States Patent [19]

Lankston

[11] 4,335,757
[45] Jun. 22, 1982

[54] TEMPORARY PIPELINE CAPPING UNIT AND METHOD OF USING SAME

[75] Inventor: Robert J. Lankston, Shawnee, Kans.

[73] Assignee: Gulf & Western Manufacturing Company, Southfield, Mich.

[21] Appl. No.: 150,198

[22] Filed: May 15, 1980

[51] Int. Cl.³ .................... F16L 55/10; F16L 55/16
[52] U.S. Cl. ...................................... 138/92; 138/89; 138/94; 138/97; 137/319
[58] Field of Search .......... 138/89, 92, 94, 97; 137/15, 315, 317, 319, 322, 528; 29/157 T

[56] References Cited

U.S. PATENT DOCUMENTS

| | | | |
|---|---|---|---|
| 2,711,753 | 6/1955 | Hoke | 137/319 |
| 2,771,096 | 11/1956 | Ver Nooy | 138/89 |
| 2,906,295 | 9/1959 | Ver Nooy | 138/94 |
| 2,988,111 | 6/1961 | Ver Nooy | 138/89 |
| 3,025,885 | 3/1962 | Ver Nooy | 138/94 |
| 3,302,661 | 2/1967 | Williams | 138/89 X |
| 3,508,577 | 4/1970 | Vincent et al. | 137/528 |
| 3,991,791 | 11/1976 | Luckenbill | 138/89 X |
| 4,204,661 | 5/1980 | Stromberg | 137/319 X |

FOREIGN PATENT DOCUMENTS

| | | | |
|---|---|---|---|
| 220703 | 6/1958 | Australia | 138/94 |
| 1196404 | 11/1959 | France | 138/94 |

Primary Examiner—James E. Bryant, III
Attorney, Agent, or Firm—Meyer, Tilberry & Body

[57] ABSTRACT

A temporary pipeline capping unit wherein the unit is permanently attached over an opening in a pipeline and includes a capped branch line nipple and an internal element isolating the branch line nipple from the pipeline opening whereby a branch line can be connected to the pipeline by uncapping the branch line nipple and attaching the branch line to this nipple. The internal element is forced by the fluid pressure in the pipeline to a position communicating the subsequently installed branch line with the pipeline opening.

33 Claims, 16 Drawing Figures

TEMPORARY PIPELINE CAPPING UNIT AND METHOD OF USING SAME

This invention relates to the art of providing a branch line on a gas or liquid pipeline and more particularly to an improved temporary pipeline capping unit and the method of using this unit.

BACKGROUND OF INVENTION

The present invention is particularly applicable for connecting branch lines to natural gas pipelines and it will be described with particular reference thereof; however, it is appreciated that the invention has broader applications and may be used in connecting branch lines to various types of pipelines, such as natural gas, oil, gasoline, water slurries, etc.

In construction of a pipeline, many miles of large metal pipe is laid through drastically varying terrain, such as the wilderness of Canada. Such pipelines are extremely expensive and often require a number of intersecting branch lines which are used for compression stations and feeder lines. To reduce the time, simplify the logistics and minimize the initial cost, a pipeline is often laid without all branch connections ultimately required for a given pipeline system. Thus, it is necessary to provide a scheme for subsequently connecting a branch line to the pipeline system. This has been done by a variety of methods. One method is illustrated in U.S. Pat. Nos. 2,771,096 and 2,988,111. A nipple is welded over the pipeline and a temporary valve is connected to the nipple. The remote side of the valve is provided with a boring machine which includes a boring tool that extends through the valve to cut an opening in the side of the pipeline. Thereafter, the valve is closed manually and a sealing member is secured by external means adjacent the pipeline. Thereafter, the valve and boring machine are removed and the pipeline branch nipple is capped. When a branch line is to be connected, the valves and boring machine are again used to remove the sealing member. The valve is ultimately opened manually to connect the branch line onto the pipeline. By this arrangement, a temporary capping unit is provided for the pipeline. However, to connect the branch line, there is a need for a large rotary valve and substantial equipment at the site. The site may be somewhat remote and the special equipment may not be available to persons who are attempting to connect the branch line. Also, this equipment may not be available many years hence. Also, the special equipment is expensive and the valving required for making the branch connection adds drastically to the cost of the branch line connection.

The most common arrangement proposed for providing a temporary cap at a pipeline for subsequent connection of a branch line, involves connecting a rotary valve to a nipple extending from the pipeline at the position of a subsequent connection. The other side of the valve includes a closed nipple. To connect the branch line, the closed nipple is opened and the connection is made. Thereafter, the valve is manually rotated to open the branch line. Such a system involves substantial, initial capital investment. These valves, which may not be used for many years, are expensive and may require periodic maintenance or service. Rotary valves may freeze in the closed position which completely bode against the feasibility of using such an arrangement for a subsequently installed branch line. As can be seen, arrangements for connecting branch lines to an operating pipeline, which branch lines may not be needed for many years, either involves a substantial amount of investment at the time the pipeline is laid or special equipment for making the branch line connection several years hence. Both of these factors are commercially unacceptable to pipeline construction firms.

THE INVENTION

The present invention relates to the provision of a temporary capping unit for a pipeline, which unit requires relatively low initial investment and no special equipment many years hence when a branch line is to be connected to the pipeline at the capping unit. Consequently, the drawbacks of the existing arrangements, as defined above, have been overcome.

In accordance with the present invention, there is provided a temporary pipeline capping unit adapted to be permanently attached over an opening in a pipeline. This cap unit comprises means for permanently attaching the unit over a pipeline opening and has a capped branch line nipple and an internal element which isolates the branch line nipple from the opening in the pipeline before a branch line connection has been made. This unit also includes means for driving the internal element, by a force created by the fluid pressure in the pipeline, to a position communicating the branch line nipple with the pipeline opening. Thus, by merely making the branch line connection to the temporary capping unit with standard pipeline technology, the pressure of the fluid in the pipeline shifts the capping unit to its permanent position for subsequent use. No special equipment is required. In addition, there is no need to interpose an expensive rotary valve for the purpose of making the branch line connection. The invention also involves the method of making a connection by using a temporary pipeline capping unit in accordance with the present invention.

The primary object of the present invention is the provision of a temporary pipeline capping unit and method of using the same, which unit and method do not involve high initial capital expenditures, do not require special equipment to make a subsequent branch connection and allow a subsequent installation of a branch line using standard pipeline techniques.

Another object of the present invention is the provision of a temporary pipeline capping unit and method, as defined above, which unit and method do not require an expensive manually operated ball or conical valve, both of which have a propensity to deteriorate and often require maintenance to remain functional.

Still a further object of the present invention is the provision of a temporary pipeline capping unit, as defined above, which unit and method will remain functional indefinitely without periodic maintenance or service, irrespective of adverse climatic conditions.

Still a further object of the present invention is the provision of a temporary capping unit, as defined above, which unit can be installed at the time the pipeline is laid for use many years hence.

These and other objects and advantages will become apparent from the following description taken together with the drawings discussed in the next section.

PREFERRED EMBODIMENTS

Figure 1:
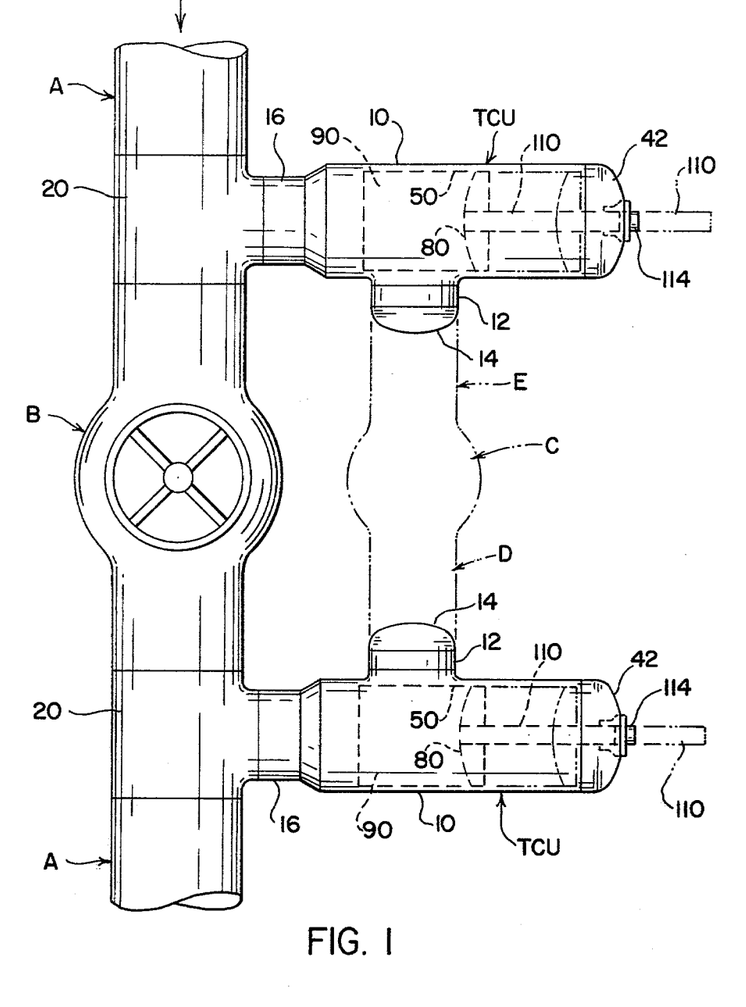
FIG. 1 is a schematic view of a pipeline illustrating a use of the preferred embodiment of the present invention.

Referring now to the drawings wherein the showings are for the purpose of illustrating a preferred embodiment of the invention only and not for the purpose of limiting same, FIG. 1 shows a standard pipeline A of the type used to convey fluids over many miles. Preferably, pipeline A is used to convey gas at high pressures, in the neighborhood of at least about 1,000 lbs per square inch with a 42 inch pipeline. The fluid in the pipeline can travel in either direction; however, the arrow in FIG. 1 indicates that fluid is passing axially through the pipeline from right to left. In the illustration of FIG. 1, a somewhat standard installation is illustrated wherein a 42 inch ball or conical valve B is used in the pipeline at an area where one or more branch lines are to be subsequently installed and connected to pipeline A. In other words, FIG. 1 illustrates an installation along the pipeline which will sometime in the future require interconnecting branch lines for various purposes. In the illustration, the branch lines are to be used as a compressor station wherein a 24 inch valve C will ultimately be connected in parallel with pipeline A. As shown in phantom lines, the installation of a valve C will require branch lines D, E. Of course, other types of branch lines could be anticipated for future use at locations along operating pipeline A. In accordance with the present invention, there is provided a temporary capping unit TCU, two of which are schematically illustrated in FIG. 1. One of the capping units is utilized for subsequent installation of branch line D. In a like manner, the other unit is permanently attached to the pipeline for subsequent installation of branch line E. Consequently, the present invention relates to a unit which is permanently attached to the pipeline at the time of initial installation so that the pipeline can be provided with branch lines at some future date. As illustrated in FIG. 1, temporary capping unit TCU includes a housing 10 with a permanent branch line nipple 12 onto which is welded a temporary cap 14 and a permanent pipeline connector or nipple 16 which is welded to a permanent T-coupling 20 at the desired longitudinal position on pipeline A. Although it is anticipated that T-coupling 20 be provided in the pipeline when laid, it is possible to provide this coupling as two halves encircling the pipeline with a hole drilled through the coupling into the pipeline as a section of the pipeline is laid. This is done during initial construction before the pipeline is put into service. Thus, coupling 20 provides a permanent connection for the outwardly extending temporary capping unit TCU, which unit is temporarily closed by cap 14 that remains in place until a branch line is connected. Thus, unit TCU is permanently secured to an opening in the pipeline at coupling 20 and remains fixed to the pipeline until a branch line such as line D, E is to be attached to the pipeline. At that time, cap 14 is removed by standard tools and a branch line is secured in place, usually by welding. Thereafter, unit TCU is actuated a single time to provide communication between the later installed branch line and the operating pipeline without interrupting operation of the pipeline.

Figures 2, 2A:
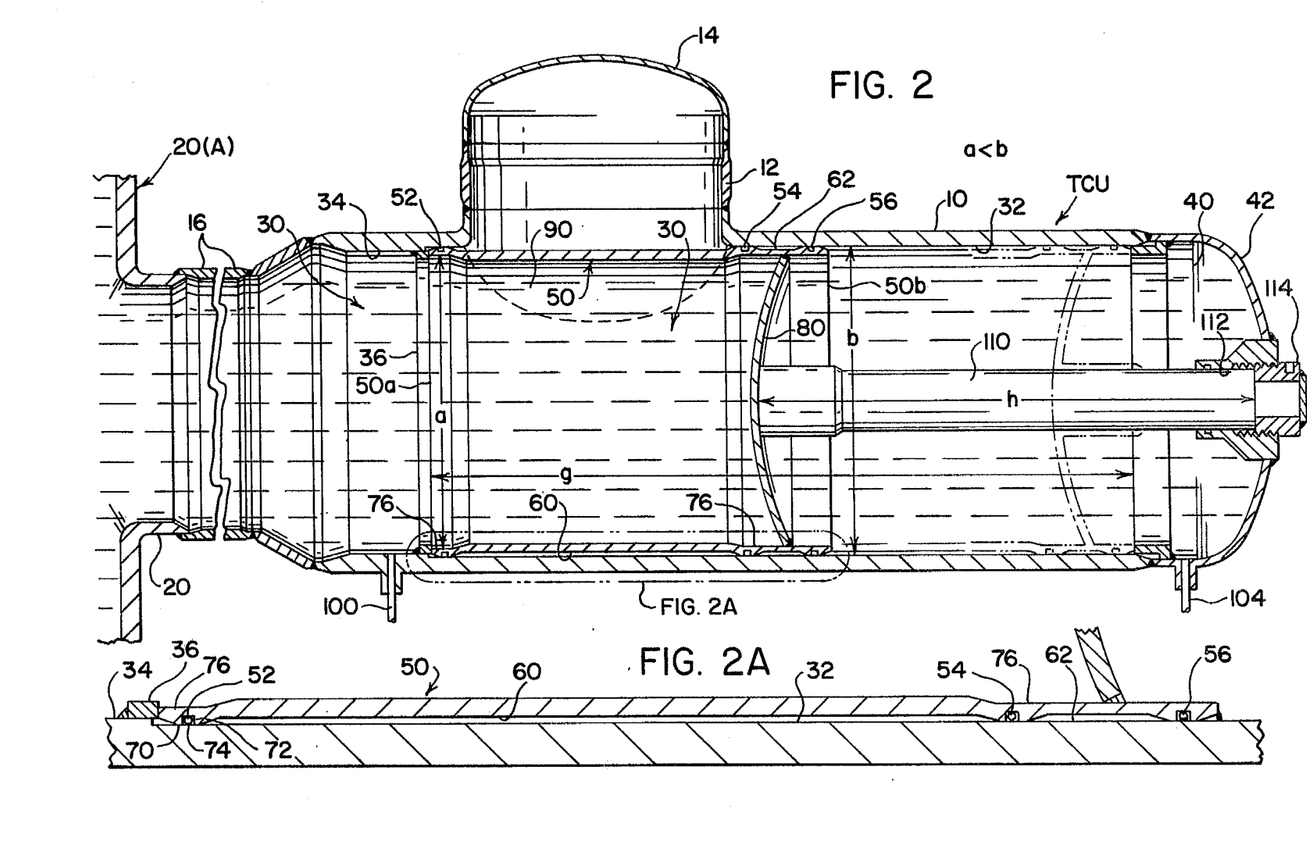
FIG. 2 is an enlarged cross-sectional view illustrating an embodiment of the invention having an indicator rod which may or may not be used.
FIG. 2A is an enlarged partial view taken generally in the phantom line area of FIG. 2.
Figure 3:
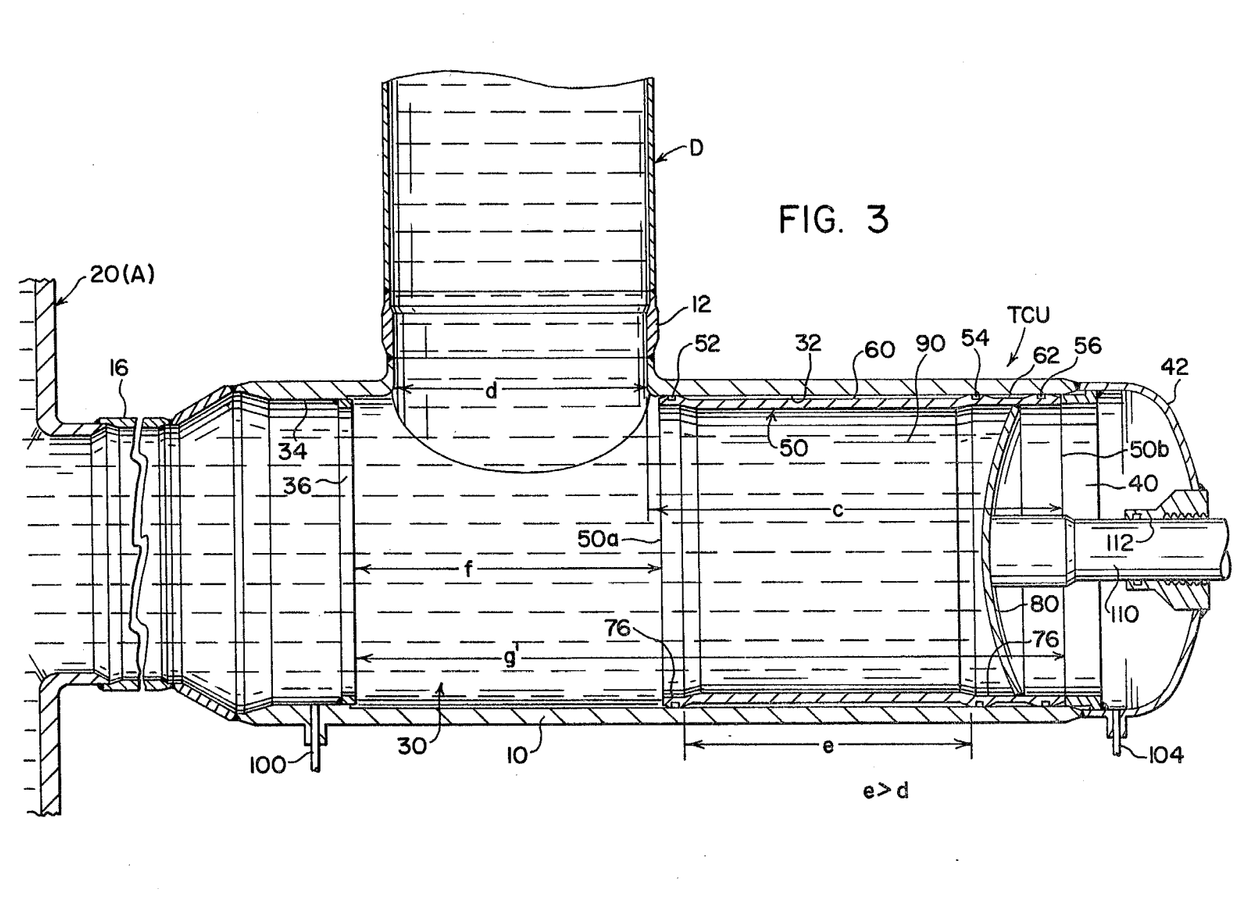
FIG. 3 is a view similar to FIG. 2 showing a branch line connection ultimately used with the preferred embodiment of the present invention with the unit in the position contemplated for use after a branch line has been installed.

Referring now to FIGS. 2 and 3, a preferred embodiment of the temporary capping unit TCU is illustrated. Housing 10 includes an elongated internal chamber 30 extending in axial alignment with nipple 16 so that the axis of the chamber extends through nipple 16 to the pipeline A. Chamber 30 includes a machined cylindrical surface 32 which has an external diameter b and terminates in a forward shoulder 34 formed by an unmachined portion of housing 10. Thus, the shoulder can combine with a forward stop ring 36 to define the forwardmost end of cylindrical surface 32, which end extends to the left of branch line nipple 12. Another stop ring 40 is secured onto end cap 42 and has an inwardly facing surface spaced from the stop or locator ring 36 a distance g. Thus, the space between rings 36, 40 is provided with the machined surface 32 to define a means for allowing a cylindrical sleeve member 50 to move between a left hand position shown in FIG. 2 and a right hand position shown in FIG. 3. As will be explained later, until a branch line is to be connected, sleeve member 50 remains in the position of FIG. 2. After a branch line has been connected to unit TCU, sleeve member 50 is operated for a single time to the right, as shown in FIG. 3. This is the permanent position of the sleeve member for continuous operation of the subsequent connected branch line.

Sleeve member 50 has radially protruding, circumferentially extending sealing rings or ribs 52, 54, 56 which generally match the inner machined cylindrical surface 32 to allow movement of sleeve member 50 at least to the right, as shown in FIG. 3, by the guiding action between surface 32 and sealing ribs 52, 54, 56. These ribs define therebetween axially spaced recesses 60, 62. Ribs 52 and 54 are adjacent the ends of sleeve member 50, whereas rib 54 is spaced inwardly from rib 56 a distance so that the length e of recess 60 is greater than the diameter d of nipple 12. This allows three position sealing between sleeve member 50 and surface 32 even when the sleeve member is in the left position, shown in FIG. 2. Although ribs 52, 54, 56 could have a variety of structures, they include a generally flat portion 70, a seal groove 72 and an O-ring seal 74 in the groove. In one embodiment of the invention, diameter b is 28.0 inches and the spacing between rib 52 and 54 is 2.0 feet, 3.0 inches. The spacing between ribs 54 and 56 is 7.0 inches. The flat portions 70 are approximately 1.0 inch in axial length. Thus, recess 60 is approximately four times as long as recess 62. The small dimension of recess 62 provides support at the right end of sleeve member 50 and also produces a dual seal fairly close together, which does not intersect the opening defined by nipple 12 in either position of sleeve member 50. The internal diameter of sleeve member 50 is defined by the inward portions 76 of sleeve member 50. This dimension a, as shown in FIG. 2, is approximately 27.0 inches in the example of the invention previously described. Thus, there is a differential between diameters a and b. The length of sleeve member 50 is c, shown in FIG. 3. In the example this dimension is 3.0 feet, 2.0 inches. The internal diameter of nipple 12, which is d, is approximately 22.8 inches. In this manner, the distance e is greater than the opening in nipple 12 and can cover the opening when sleeve member 50 is in the position shown in FIG. 2.

When sleeve member 50 is in the position shown in FIG. 2, front edge 50a is in a sealed relationship with abutment or stop ring 36 and sealing ribs 52, 54 straddle the opening defined by branch line nipple 12. This closes nipple 12 from internal chamber 30 and isolates the branch line nipple from an opening in pipeline nipple 16. In the position shown in FIG. 3, sleeve member 50 is shifted to the right with rear edge 50b in abutment with stop ring 40. This spaces front edge 50a a distance f from ring 36. In this position, sealing rib 52 is to the right of the opening defined by branch line nipple 12 so that there is a continuous tertiary seal between surface 32 and the sleeve member. In accordance with one aspect of the invention, sleeve member 50 is moved a single time to the right as shown in FIG. 3 with a force created by pressure of the fluid in pipeline A. Consequently, there is no external driving mechanism for driving sleeve member 50, except to the extent of valving to be explained later. To accomplish the single shift of sleeve member 50 from the left closed position to the right operative position, sleeve member 50 includes a dome-shaped partition 80 located between the closely spaced sealing ribs 54, 56 so that sleeve member 50 is formed into a hollow piston having an internal chamber 90 continuously exposed by nipple 16 to the fluid in pipeline A. When the hollow piston is in the cocked or normal branch line awaiting position, as shown in FIG. 3, the effective area to the left is determined by internal diameter a. The pressure around flat portion 70 generally causes the force to the right to be determined by diameter b. To prevent movement of sleeve member 50 from the cocked awaiting position, a force equalling the left hand force on the hollow piston is exerted from the right hand side of partition 80. This balancing force, in the preferred embodiment of the invention is created by using the fluid pressure in pipeline A. To accomplish this, as shown in FIGS. 4–7, there is a line 100 permanently communicated with pipeline A through chamber 30 and nipple 16. A two way valve 102 connects this line with a fluid line 104 in cap 42. Line 104 is directed to a dumping or vent valve 106.

When installed on a pipeline, unit TCU has sleeve member 50 to the left, as shown in FIG. 2. This position of sleeve member 50 is established when unit TCU is fabricated or at least by the time it is installed on pipeline A. The friction between sleeve member 50 and surface 32 can hold the sleeve member in place during transit and installation. The diameter controlling the force to the left, as shown in FIG. 2, is internal diameter b, which generally corresponds to the external diameter of sleeve member 50. This area produces a balancing force to the left when pipeline pressure is applied to both sides of partition 80.

Figure 4:
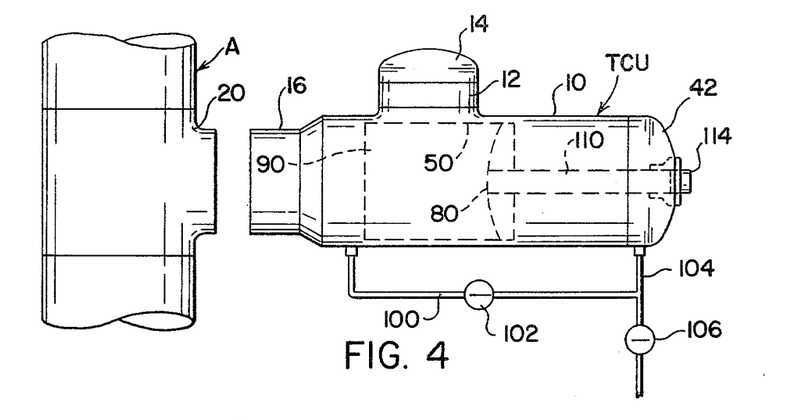
FIG. 4 is a schematic view illustrating the preferred embodiment of the invention as shipped and preparatory to installation on a pipeline.

In the field, nipple 16 is welded to T-coupling 20. After this installation step, pipeline A is gradually brought up to pressure while valve 102 is open. Valve 106 is closed, as shown in FIG. 4. As the pressure in line A increases gradually toward an operating level, there is an equalization of pressure between lines 100, 104. This equalizes pressure on opposite sides of the hollow piston formed by sleeve member 50 and partition 80. Consequently, there is no sufficient differential in force that will cause shifting of sleeve member 50 to the right against the frictional forces holding sleeve member 50 in place.

Figure 5:
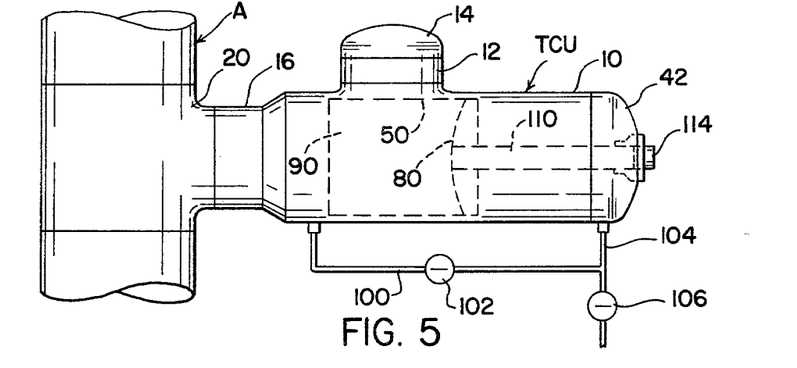
FIG. 5 is a view similar to FIG. 4 showing the preferred embodiment of the present invention connected to the pipeline in a condition for subsequent installation of a branch line connection.
Figure 6:
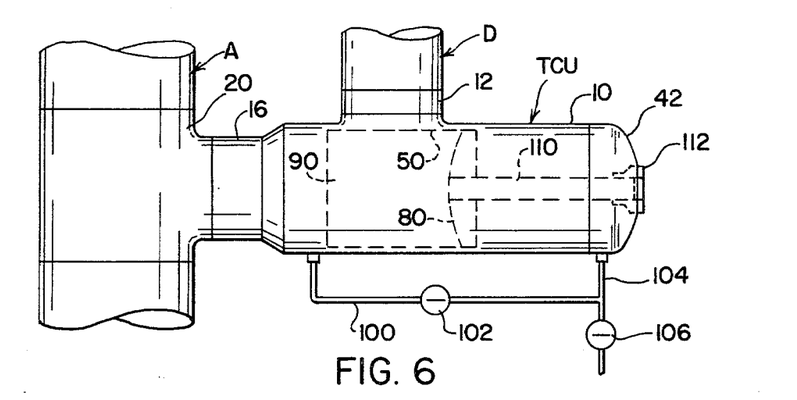
FIG. 6 is a view similar to FIG. 5 illustrating a branch line connection being made to the preferred embodiment of the invention and before the unit has been triggered into its branch line connection condition.
Figure 7:
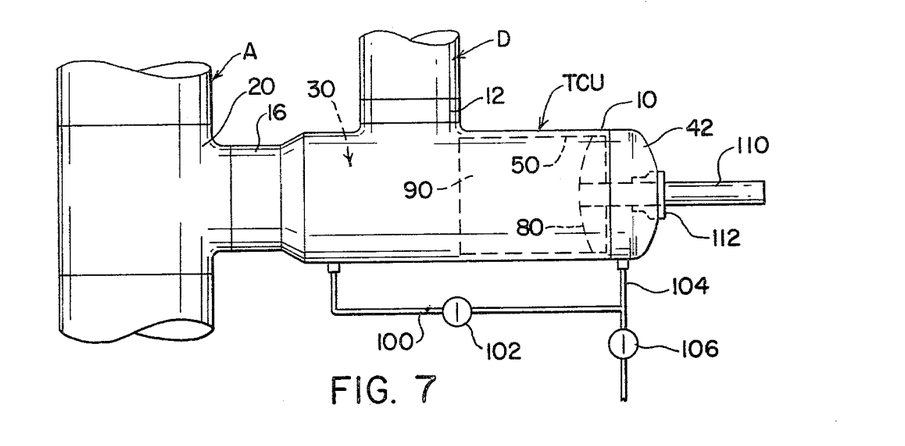
FIG. 7 is a view similar to FIG. 6 with the preferred embodiment of the invention having been triggered to its branch line connection condition.

As shown in FIG. 5, capping unit TCU is in operation with pressure in line A holding sleeve member 50 in place. As illustrated, inner chamber 90 of the hollow piston is formed by sleeve 50 and partition 80. This chamber is continuously subject to line pressure. Since the same pressure is maintained behind partition 80, the piston remains in the left hand position. This condition lasts until it is desired to install a branch line, such as branch line D. Cap 14 is then removed from nipple 12 and branch line D is installed, as illustrated in FIG. 6. Because the hollow piston remains in the left hand position, work on branch line D can be done without interference with fluid travelling through pipeline A. Thus, the pipeline can remain in service while branch line D is attached onto unit TCU. After the attachment of the branch line, dump or vent valve 106 is opened. This vents the right side of partition 80. Thus, there is a pressure differential which creates a force differential urging sleeve member 50 to the right, as shown in FIG. 7. This forces the sleeve member into the position shown in FIG. 3 which provides direct access between nipple 12 and nipple 16. Thus, branch line D is permanently attached to the pipeline without interrupting the operation of the pipeline. To assure movement of sleeve member 50 to the right and prevent discharge of gas, valve 102 is closed. As can be seen, when sleeve member 50 is in the right position, the effective area on both sides of partition 80 are substantially the same. If valves 102, 106 were placed back into their original positions, as shown in FIG. 4, sleeve member 50 would not move to the left. Thus, in the illustrated embodiment of the invention, the movement of sleeve member 50 is a one shot or one time operation that is triggered by shifting valves 102, 106. By providing partition 80 substantially between the two closely spaced ribs 54, 56, the partition operates on a reinforced portion of sleeve member 50 and prevents any binding during the one time shift of sleeve member 50 to the right as shown in FIG. 3. Of course, only two ribs could be used. When this is done, partition 80 is located behind the rear rib.

In FIGS. 2 and 3, there is illustrated a locking rod 110 which is an optional feature that could be incorporated into unit TCU. When this rod is used, it will extend through nipple 112 having an appropriate seal, not shown. By properly selecting the lengths h of rod 110, a cap 114 threaded on nipple 112 is used to hold sleeve member 50 to the left, as shown in FIG. 2. This mechanically secures the sleeve member in the initial shift condition. To operate unit TCU, cap 114 is removed, as shown in FIG. 6. As sleeve member 50 is moved to the right, rod 110 passes through nipple 112. Consequently, the outward position of rod 110 provides information regarding the inward position of the sleeve member in housing 10. This rod is illustrated; however, it is not now anticipated for general use in the field and other mechanical or hydraulic locks are employed.

Figure 9:
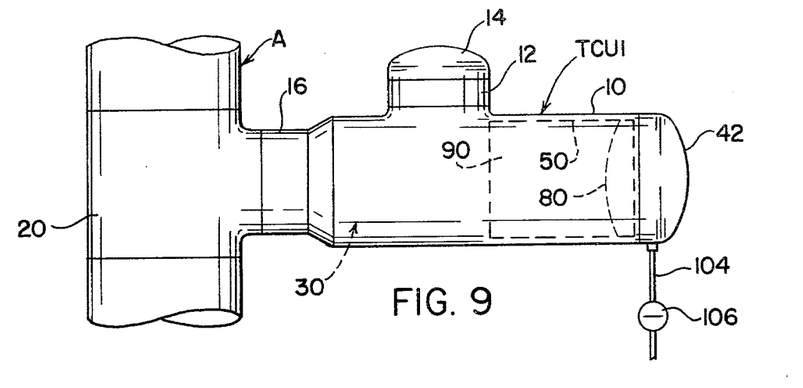
FIGS. 9–11 illustrate a modification of the preferred embodiment of the invention, as shown in FIGS. 4–7.
Figure 10:
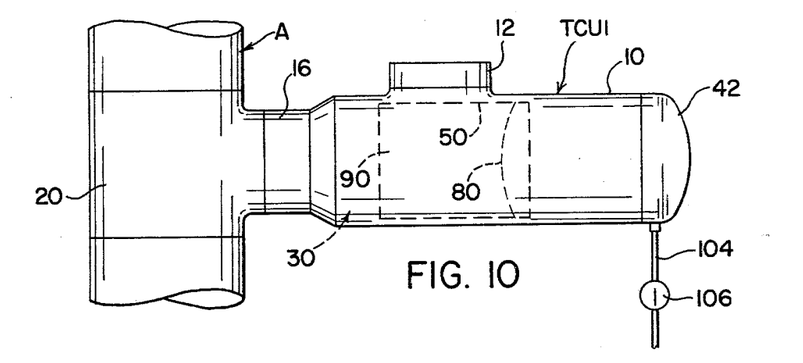
Figure 11:
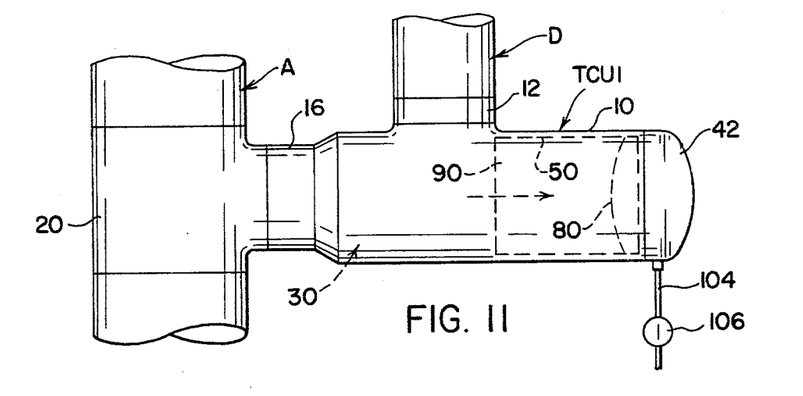

A modification of the preferred embodiment of the invention is illustrated in FIGS. 9-11 wherein the temporary capping unit TCU 1 is constructed essentially the same as the unit TCU, except the rod 110 is eliminated and only line 104 and valve 106 are used in the fluid operating system. In accordance with this concept, sleeve member 50 can be shipped in the right hand position as shown in FIG. 9. When the branch line is to be connected, valve 106 is opened and pressurized fluid is applied through line 104 to the right hand side of partition 80. As the pressure increases to a pressure substantially greater than the pipeline pressure, sleeve member 50 shifts to the left hand position as shown in FIG. 10 and FIG. 2. Thereafter, cap 14 is removed and branch line D is secured onto nipple 12 as shown in FIG. 11. Fluid is then exhausted from cap 412 through line 104. This shifts sleeve member 50 to the right as shown in FIG. 11 for normal operation of branch line D. As can be seen, this embodiment of the invention allows movement of sleeve member 50 to the left and then back to the right for installation of a branch line. Such a system requires high pressure fluid at the site. This may not be available or may be inconvenient. Consequently, even when using the embodiment shown in FIGS. 9-11 it is anticipated that sleeve member 50 will be shifted to the left hand position before installation of unit TCU 1 or, at least, before the pipeline is pressurized. To do this, before installation, a non-compressible fluid, i.e., a liquid, is pumped into housing 10 through line 104. Thereafter, valve 106 is closed. This moves and/or holds sleeve member 50 to the left. When a branch connection is to be made, cap 14 is removed and the branch line D is installed. Thereafter, the vent valve 106 is opened to exhaust liquid from housing 10. The pressure in pipeline A forces sleeve 50 to the right, as shown in FIG. 11, for continuous use. Consequently, in FIGS. 9-11, pressure in pipeline A is a motivating force for shifting sleeve member 50 to the right. When using a liquid before pressurizing the pipeline, only operation of single valve 106 is needed in the field to place a branch line in operation.

Figure 8:
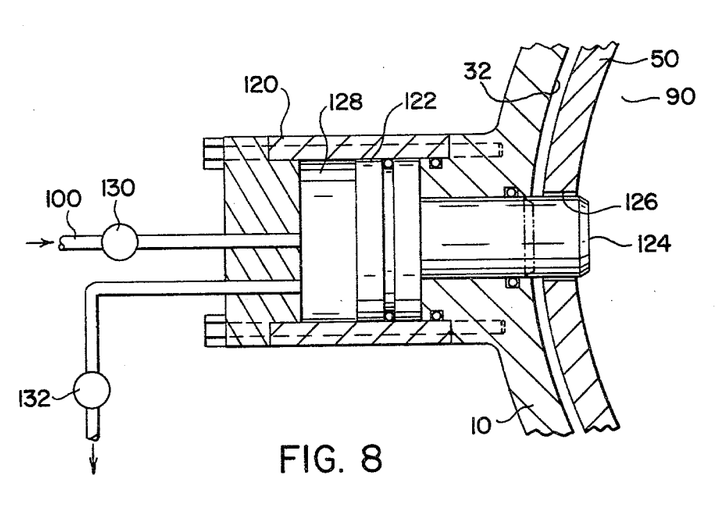
FIG. 8 is an enlarged cross-sectional view showing a fluid locking arrangement which can be used in the preferred embodiment of the present invention.

It is anticipated that a positive locking device will be used for locking sleeve member 50 in the left hand position as shown in FIG. 2. As previously indicated, rod 110 can perform this function; however, FIG. 8 illustrates a fluid arrangement for positively locking sleeve member 50 in position. In this illustrated embodiment, housing 120 receives a reciprocal piston 122 having an inwardly extending pin 124 which extends into an opening 126 in member 50 when the member is in the left hand position. Chamber 128 behind piston 122 is connectable selectively to line 100 by a valve 130. In addition, this chamber may be exhausted by a valve 132. In operation, pin 124 extends into opening 126, as shown in FIG. 8, during shipment. It is held in place by friction or any other arrangement. After temporary capping unit TCU is installed, valve 130 is opened. Thus, pressure in chamber 128 is the same as pressure within chamber 90. Since pin 124 has a smaller diameter than piston 122, a greater force is exerted on the piston than on the pin. Thus, the pin is held in place. After the branch line connection has been made, valve 130 is closed and valve 132 is opened. Thus, pressure in chamber 90 is exerted on the end of pin 124. This forces the pin inward so piston 122 collapses in chamber 128. Pin 124 disengages opening 126 and allows release of sleeve member 50 for movement to the right. Thus, a positive arrangement is provided for holding the sleeve member in the normal left hand position preparatory to subsequent connection of branch line D.

Figure 12:
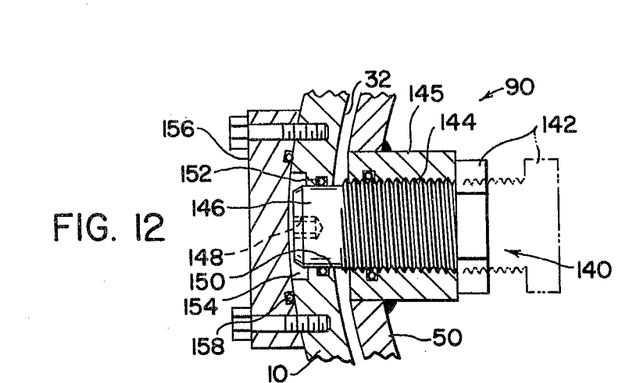
FIG. 12 is an enlarged, partial cross-sectional view showing a mechanical locking arrangement for locking the preferred embodiment of the invention in the position shown in FIG. 4.

A mechanical arrangement to holding sleeve member 50 in the left hand position as shown in FIG. 2 is illustrated in FIG. 12. In this arrangement, a mechanical shank 144 received in coupling 145 and an outwardly extending pin 146 having a tool recess 148 in the outer end thereof. Pin 146 extends outwardly from sleeve member 50 into aperture 150 of housing 10. An optional seal 152 may surround pin 146 so that the pin is sealed with respect to housing 10. A recess 154 is covered by a plate 156 for the purposes of unlocking or unlatching sleeve member 50 and for determining the position of the sleeve member. When using this arrangement, at the time of assembly, mechanical element 140 is threaded through coupling 145 so that pin 146 extends into aperture 150. To determine the position of sleeve 50, plate 156 having a peripheral gasket 158 can be removed. If pin 146 is visible, sleeve member 50 is locked in the left hand position. To unlock the sleeve member after a branch line has been connected, a wrench is inserted into recess 148 and element 140 is rotated. This draws pin 146 from opening 150. After this is done, plate 156 is replaced and member 50 is shifted to the right. Member 140 is provided with an arrangement for preventing it from being disengaged from threaded coupling 145.

Figure 13:
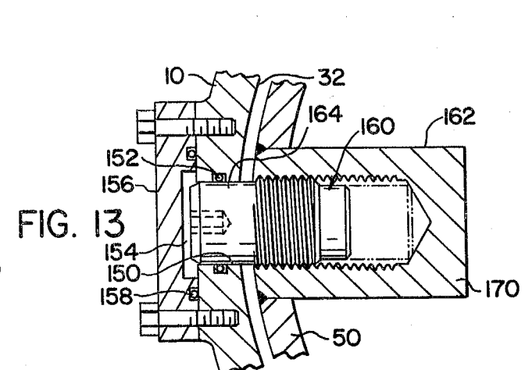
FIG. 13 is an enlarged, partial cross-sectional view showing another mechanical locking mechanism.

A modification of the mechanical locking mechanism of FIG. 12 is shown in FIG. 13 wherein locking member 160 is threaded in boss 162 and includes pin 164 which enters aperture 150 to lock sleeve member 50 in position. Closed end 170 of boss 162 prevents member 160 from being disengaged from the boss. This locking mechanism operates in the manner of the structure of FIG. 12.

Figure 14:
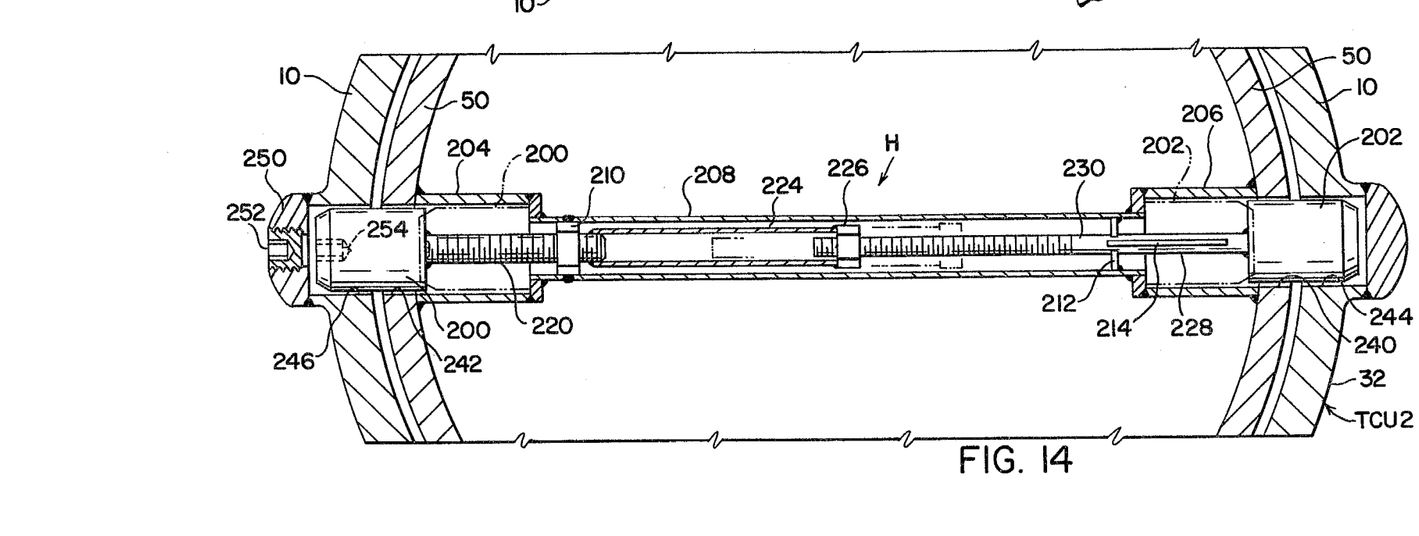
FIG. 14 is an enlarged cross-sectional view showing a preferred embodiment of a mechanical locking mechanism; and, FIG. 15 is a side elevational view of a preferred embodiment of the present invention.

A preferred embodiment of the mechanical holding device H is illustrated in FIG. 14 wherein locking members 200, 202 are mounted in recepticles 204, 206 connected by tube 208 having a fixed nut 210 and a fixed collar 212 with slit 214. Member 200 includes a threaded shaft 220 terminating in a tube 224 onto which is secured a nut 226. Member 202 includes a shaft 230 telescoped into tube 224 and threaded through nut 226. A key 228 limits rotation of shaft 230 by engaging slit 214. By securing device H over apertures 240, 242 of sleeve member 50 and in alignment with apertures 244, 246 of housing 10 when the sleeve is in the left position of FIG. 2, member 200, 202 can be threaded outwardly to provide a mechanical lock. To release locking device H, member 200 is rotated from outside housing 10. To provide access for such rotation, cap 250 includes a removable plug 252. Members 200, 202 are moved to the phanthom line position shown in FIG. 13 by a wrench engaging recess 254. In this position, an operator can shift sleeve member 50 into the branch connection position. External viewing of members 200, 202 indicate that sleeve member 50 is in the left hand position for working on the branch connection. The thread on 230 has approximately twice the pitch length as the thread on shaft 220 so that as member 200 is rotated in one direction it moves inward at the rate of non-rotatable member 202. Other arrangements could be used to move members in and out in unison.

Figure 15:
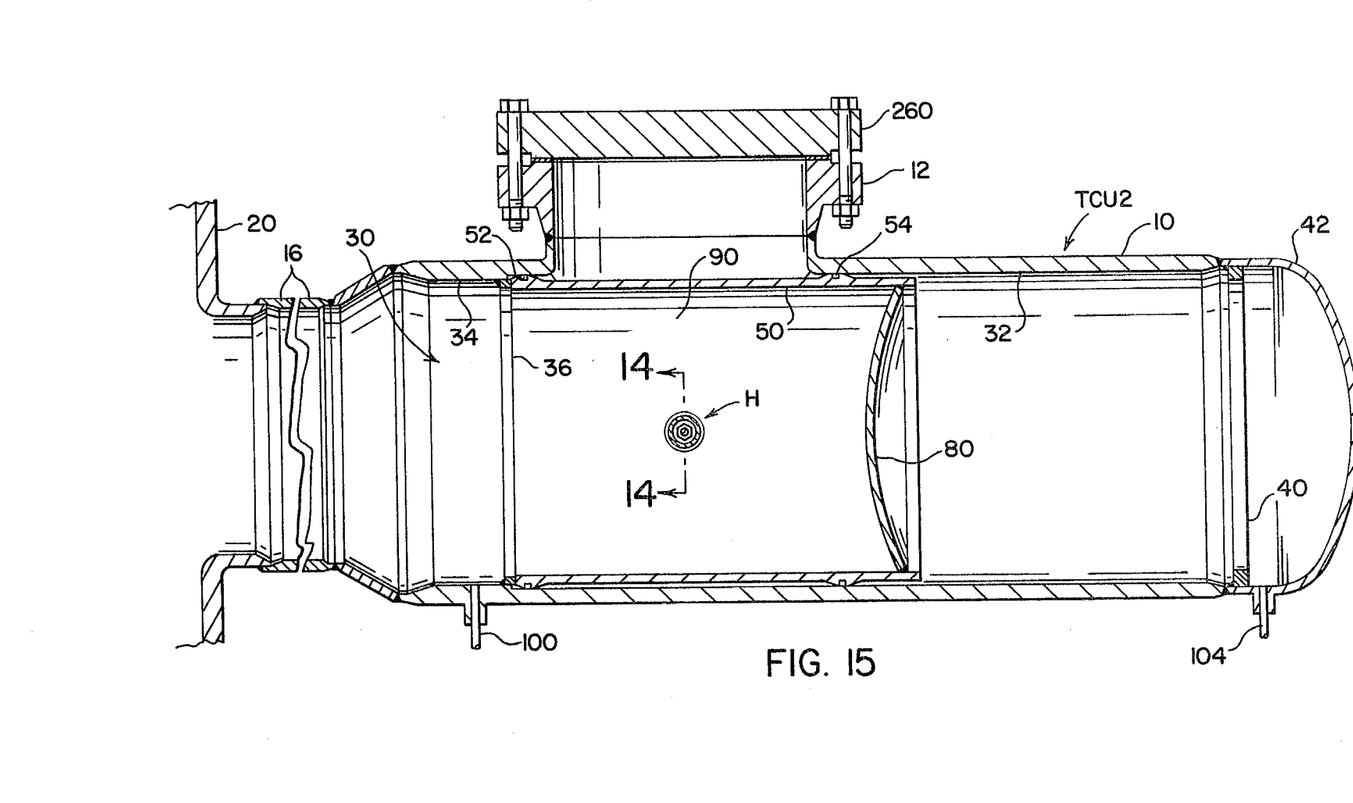

A temporary capping unit TCU 2 uses locking mechanism H and is shown in more detail in FIG. 15. This preferred embodiment uses only two sealing ribs 52, 54 with partition 80 being outboard of rib 54. A bolted cap 260 is temporarily secured to branch line nipple 12. The operation of unit TCU 2 is the same as unit TCU shown in FIGS. 4-7. Since mechanism H provides visual indication of sleeve member 50 in the cocked condition and holds the member in this position, optional bar 110 is not used in the embodiment. The bolted cap or flange 260 could be used in all embodiments. Also, the junction with nipple 16 or pipe 20 could be a bolted flange. This nipple is shown as having a lap welded joint with respect to pipe 20; however, any other welded joint could be used, such as a butt weld.

Referring again to FIG. 2, if the seal between inward portion 76 and ring 36 were fluid tight, the differential between the areas determined by diameters a and b could be used to cause a force exerting member 50 to the left after installation. In practice, the hydraulic and mechanical locking mechanisms are anticipated.

Having thus described the invention, it is claimed:

1. A temporary pipeline capping unit to be permanently secured over a side opening in a pipeline for allowing subsequent connection of a branch line onto said pipeline and/or communicating said branch line with said side opening while maintaining fluid flow and/or operating pressure in said pipeline, said capping unit comprising: a housing with an elongated chamber having first and second axially spaced ends, a generally cylindrical inwardly facing surface at least at said first end, means forming an axial opening communicating with said chamber at said first end, and means forming a branch opening intersecting said cylindrical surface adjacent said first end; a sleeve member having a generally cylindrical portion with an outer surface generally matching said inwardly facing surface; means for slidably sealing said outer surface and said inwardly facing surfaces; said sleeve member being axially shiftable in said chamber between a closed position adjacent said first end with said outer surface of said sleeve member sealing said branch opening from said chamber and an opened position with said sleeve member shifted away from said first end and with said branch opening communicated with said axial opening; means for securing said sleeve member in said closed position; means for selectively releasing said sleeve member only when it is desired to shift said member into said opened position; and, fluid means operated by pressure in said pipeline for selectively shifting said sleeve member from said closed position to said opened position whereupon said sleeve member remains in said opened position.

2. A temporary pipeline capping unit as defined in claim 1 wherein said means for securing includes an element locking said sleeve with respect to said housing.

3. A temporary pipeline capping unit as defined in claim 2 wherein said locking element is shiftable from a locking position to a sleeve releasing position and including mechanical means for shifting said locking element in said locking position.

4. A temporary pipeline capping unit as defined in claim 2 wherein said locking element is shiftable from a sleeve locking position to a sleeve releasing position and including fluid responsive means for shifting said element into said locking position.

5. A temporary pipeline capping unit as defined in claim 4 wherein said fluid responsive means includes means responsive to pressure in said pipeline for shifting said locking element into said sleeve locking position.

6. A temporary pipeline capping unit as defined in claim 2 wherein said element is shiftable from a sleeve member locking position to a sleeve member releasing position, means for mounting said element on said sleeve member and extending into a receptacle on said housing and means accessible from outside said housing for shifting said element inwardly from said receptacle to define said sleeve member releasing position.

7. A temporary pipeline capping unit to be permanently secured over a side opening in a pipeline for allowing subsequent connection of a branch line onto said pipeline and/or communicating said branch line with said side opening while maintaining fluid flow and/or operating pressure in said pipeline, said capping unit comprising: a housing with an elongated chamber having first and second axially spaced ends, a generally cylindrical inwardly facing surface at least at said first end, means forming an axial opening communicating with said chamber at said first end, and means forming a branch opening intersecting said cylindrical surface adjacent said first end; a sleeve member having a generally cylindrical portion with an outer surface generally matching said inwardly facing surface; means for slidably sealing said outer surface and said inwardly facing surfaces; said sleeve member being axially shiftable in said chamber between a closed position adjacent said first end with said outer surface of said sleeve member sealing said branch opening from said chamber and an opened position with said sleeve member shifted away from said first end and with said branch opening communicated with said axial opening; means for securing said sleeve member in said closed position; fluid means operated by pressure in said pipeline for selectively shifting said sleeve member from said closed position to said opened position whereupon said sleeve member remains in said opened position; and, said sleeve member including an axial partition forming said sleeve member into a hollow piston.

8. A temporary pipeline capping unit as defined in claim 7 wherein said piston has an internal diameter and a larger external diameter and said securing means includes pressure equalizing means for communicating pressure in said pipeline to both a first effective area defined generally by said internal diameter and facing said first end and a second effective area defined generally by said external diameter and facing said second end whereby a resultant force toward said first end is maintained on said piston.

9. A temporary pipeline capping unit as defined in claim 8 wherein said pressure equalizing means includes a conduit communicating said first end of said chamber with said second end of said chamber at least when said sleeve member is in said closed position.

10. A temporary pipeline capping unit as defined in claim 7 and including pressure equalizing means for communicating pressure in said pipeline to first and second ends of said chamber while said sleeve member is in said closed position.

11. A temporary pipeline capping unit as defined in claim 10 wherein said fluid means for shifting said sleeve member includes means for exhausting said second end of said chamber.

12. A temporary pipeline capping unit as defined in claim 11 wherein said pressure equalizing means includes a selectively operated valve for interruption of pressure communication of said second end and said pipeline.

13. A temporary pipeline capping unit as defined in claim 7 wherein said securing means includes means for creating a first fluid pressure in said second end of said chamber sufficiently high to hold said piston with said sleeve member in said closed position against force created by pressure from said pipeline on said piston from said first end of said chamber.

14. A temporary pipeline capping unit as defined in claim 13 wherein said fluid means for shifting said sleeve member includes means for selectively reducing said first fluid pressure.

15. A temporary pipeline capping unit as defined in claim 7 wherein said fluid means operable by pressure in said pipeline is normally operable only once.

16. A temporary pipeline capping unit as defined in claim 1 wherein said fluid means operable by pressure in said pipeline is normally operable only once.

17. A temporary pipeline capping unit as defined in claim 7 including an opening in said chamber at said second end and a rod extending from said partition and aligned with said opening, said rod having a length to extend from said chamber when said sleeve member is in said opened position.

18. A temporary pipeline capping unit as defined in claim 17 including a temporary closure over said rod aligned opening and wherein said rod length is sufficient to hold said sleeve member in said closed position when said closure is over said rod aligned opening.

19. A temporary pipeline capping unit as defined in claim 7 wherein said sleeve member has first and second axial ends and a circumferential, sliding sealing structure between said sleeve member and said chamber at each of said axial ends of said sleeve member.

20. A temporary pipeline capping unit as defined in claim 19 including an additional circumferential, sliding sealing structure adjacent one of said first mentioned sealing structures and said partition is secured to said sleeve member between said additional sealing structure and said one sealing structure.

21. A temporary pipeline capping unit comprising a housing with an internal chamber, a first opening communicated with said chamber and adapted to be permanently secured onto a side opening of a pipeline and a second opening selectively communicable with said chamber and adapted to be temporarily capped, a slidable member in said chamber and having a first position sealing said second opening from said chamber and a second position communicating said second opening with said chamber; means for releasably holding said slidable member in said first position and fluid means operable one time for shifting said slidable member into said second position, said fluid means including a pressure driven element connected to said slidable member with a first surface exposed to fluid in said chamber and an opposing second surface normally subjected to a balancing equalizing fluid and means for selectively reducing the pressure on said equalizing fluid to selectively shift said member into said second position.

22. A method of connecting a branch line with an opening in a pipeline, said method comprising the steps of:
(a) permanently attaching a unit over said opening, said unit having a capped branch line nipple and an internal element isolating said branch line nipple from said pipeline opening;
(b) uncapping said branch line nipple;
(c) attaching said branch line to said nipple; and,
(d) driving said element by a force created by fluid pressure in said pipeline to a position communicating said branch line nipple with said pipeline opening.

23. A temporary pipeline capping unit adapted to be attached over an opening of a pipeline, said capping unit comprising means for permanently attaching said unit over said pipeline opening, said unit having a capped branch line nipple and an internal element isolating said branch line nipple from said opening in said pipeline; selectively actuated operating means for driving said element by a force created by fluid pressure in said pipeline to a position communicating said branch line nipple with said pipeline opening and normal means for activating said operating means when said member is to be moved into said communicating position.

24. A temporary pipeline capping unit as defined in claim 1 wherein said sleeve securing means includes first and second locking pins carried by said sleeve member at generally diametrically spaced locations on said sleeve member; means for moving said locking pins between first positions lockingly engaging said housing and second positions releasing said locking engagement; and, operating means operative from outside said housing for shifting said pins into said second positions of said pins.

25. A temporary pipeline capping unit as defined in claim 24 including means for mechanically interconnecting said pins, said interconnecting means including means for causing said pins to move in unison between pin position.

26. A temporary pipeline capping unit to be permanently secured over a side opening in a pipeline for allowing subsequent connection of a branch line onto said pipeline and/or communicating said branch line with said side opening while maintaining fluid flow and/or operating pressure in said pipeline, said capping unit comprising: a housing with an elongated chamber having first and second axially spaced ends, a generally cylindrical inwardly facing surface at least at said first end, means forming an axial opening communicating with said chamber at said first end, and means forming a branch opening intersecting said cylindrical surface adjacent said first end; a sleeve member having a generally cylindrical portion with an outer surface generally matching said inwardly facing surface; means for slidably sealing said outer surface and said inwardly facing surfaces; said sleeve member being axially shiftable in said chamber between a closed position adjacent said first end with said outer surface of said sleeve member sealing said branch opening from said chamber and an opened position with said sleeve member shifted away from said first end and with said branch opening communicated with said axial opening; means for securing said sleeve member in said closed position; fluid means operated by pressure in said pipeline for selectively shifting said sleeve member from said closed position to said opened position whereupon said sleeve member remains in said opened position; and, said sleeve member having an internal diameter and a larger external diameter and said securing means including pressure equalizing means for communicating pressure in said pipeline to both a first effective area defined generally by said internal diameter and facing said first end and a second effective area defined generally by said external diameter and facing said second end whereby a resultant force toward said first end is maintained on said piston.

27. A temporary pipeline capping unit as defined in claim 26 wherein said pressure equalizing means includes a conduit communicating said first end of said chamber with said second end of said chamber at least when said sleeve member is in said closed position.

28. A temporary pipeline capping unit to be permanently secured over a side opening in a pipeline for allowing subsequent connection of a branch line onto said pipeline and/or communicating said branch line with said side opening while maintaining fluid flow and/or operating pressure in said pipeline, said capping unit comprising: a housing with an elongated chamber having first and second axially spaced ends, a generally cylindrical inwardly facing surface at least at said first end, means forming an axial opening communicating with said chamber at said first end, and means forming a branch opening intersecting said cylindrical surface adjacent said first end; a sleeve member having a generally cylindrical portion with an outer surface generally matching said inwardly facing surface; means for slidably sealing said outer surface and said inwardly facing surfaces; said sleeve member being axially shiftable in said chamber between a closed position adjacent said first end with said outer surface of said sleeve member sealing said branch opening from said chamber and an opened position with said sleeve member shifted away from said first end and with said branch opening communicated with said axial opening; means for securing said sleeve member in said closed position; fluid means operated by pressure in said pipeline for selectively shifting said sleeve member from said closed position to said opened position whereon said sleeve member remains in said opened position; and, including pressure equalizing means for communicating pressure in said pipeline to first and second ends of said chamber while said sleeve member is in said closed position.

29. A temporary pipeline capping unit as defined in claim 28 wherein said fluid means for shifting said sleeve member includes means for exhausting said second end of said chamber.

30. A temporary pipeline capping unit as defined in claim 29 wherein said pressure equalizing means includes a selectively operated valve for interruption of pressure communication of said second end and said pipeline.

31. A temporary pipeline capping unit to be permanently secured over a side opening in a pipeline for allowing subsequent connection of a branch line onto said pipeline and/or communicating said branch line with said side opening while maintaining fluid flow and/or operating pressure in said pipeline, said capping unit comprising: a housing with an elongated chamber having first and second axially spaced ends, a generally cylindrical inwardly facing surface at least at said first end, means forming an axial opening communicating with said chamber at said first end, and means forming a branch opening intersecting said cylindrical surface adjacent said first end; a sleeve member having a generally cylindrical portion with an outer surface generally matching said inwardly facing surface; means for slidably sealing said outer surface and said inwardly facing surfaces; said sleeve member being axially shiftable in said chamber between a closed position adjacent said first end with said outer surface of said sleeve member sealing said branch opening from said chamber and an opened position with said sleeve member shifted away from said first end and with said branch opening communicated with said axial opening; means for securing said sleeve member in said closed position; fluid means operated by pressure in said pipeline for selectively shifting said sleeve member from said closed position to said opened position whereupon said sleeve member remains in said opened position; and, wherein said securing means includes means for creating a first fluid pressure in said second end of said chamber sufficiently high to hold said piston with said sleeve member in said closed position against force created by pressure from said pipeline on said piston from said first end of said chamber.

32. A temporary pipeline capping unit as defined in claim 31 wherein said fluid means for shifting said sleeve member includes means for selectively reducing said first fluid pressure.

33. A temporary pipeline capping unit to be permanently secured over a side opening in a pipeline for allowing subsequent connection of a branch line onto said pipeline and/or communicating said branch line with said side opening while maintaining fluid flow and/or operating pressure in said pipeline, said capping unit comprising: a housing with an elongated chamber having first and second axially spaced ends, a generally cylindrical inwardly facing surface at least at said first end, means forming an axial opening communicating with said chamber at said first end, and means forming a branch opening intersecting said cylindrical surface adjacent said first end; a sleeve member having a generally cylindrical portion with an outer surface generally matching said inwardly facing surface; means for slidably sealing said outer surface and said inwardly facing surfaces; said sleeve member being axially shiftable in said chamber between a closed position adjacent said first end with said outer surface of said sleeve member sealing said branch opening from said chamber and an opened position with said sleeve member shifted away from said first end and with said branch opening communicated with said axial opening; means for securing said sleeve member in said closed position; fluid means operated by pressure in said pipeline for selectively shifting said sleeve member from said closed position to said opened position whereupon said sleeve member remains in said opened position; and, wherein said fluid means operable by pressure in said pipeline is normally operable only once.

* * * * *

UNITED STATES PATENT AND TRADEMARK OFFICE
CERTIFICATE OF CORRECTION

PATENT NO. : 4,335,757
DATED : June 22, 1982
INVENTOR(S) : Robert J. Lankston

It is certified that error appears in the above-identified patent and that said Letters Patent are hereby corrected as shown below:

In the drawings, Sheet 2, Fig. 2, the lead line from reference numeral 40 should extend to the stop ring secured onto end cap 42, Sheet 3, Fig. 3, the left end of dimension line C should terminate at the line denoting the left end of the sleeve 50, and the line to which the left-hand arrow of dimension line C points should be deleted; Sheet 7, Fig. 14, the lead line from reference numeral 220 should extend to the elongated key on shaft 30, and the lead line from reference numeral 214 should extend to the slit in collar 212. Column 3, line 39, "side elevational" should read --cross-sectional--. Column 4, line 67, reference numeral "54" should read --56--. Column 5, line 9, after "spacing" insert --e--, and "rib" should read --ribs--. Column 7, line 3, "lengths" should read --length--. Column 8, line 51, "recepticles" should read --receptacles--. Column 9, line 8, after "move" insert --the--. Column 12, line 39, after "between" insert --said--; line 40, "position" should read --positions--.

Signed and Sealed this

First Day of February 1983

[SEAL]

Attest:

GERALD J. MOSSINGHOFF

Attesting Officer     Commissioner of Patents and Trademarks